July 20, 1965     E. J. SCHODER ET AL     3,196,068
APPARATUS FOR WELDING THERMOPLASTIC SHEET MATERIAL
Filed July 26, 1962
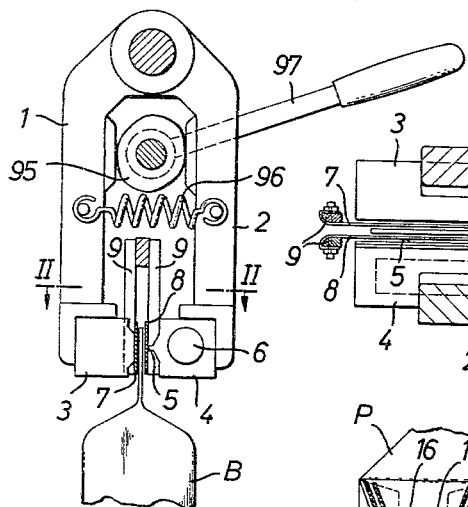
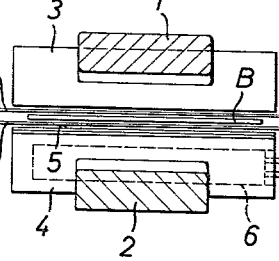
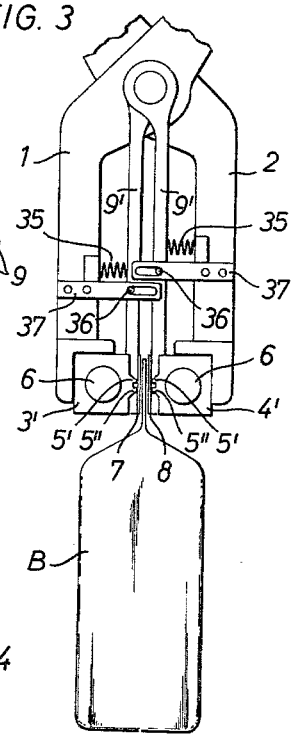
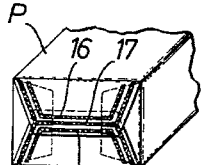
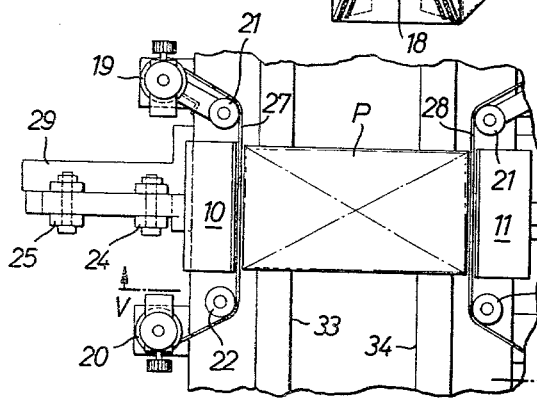
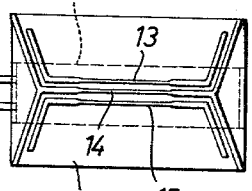
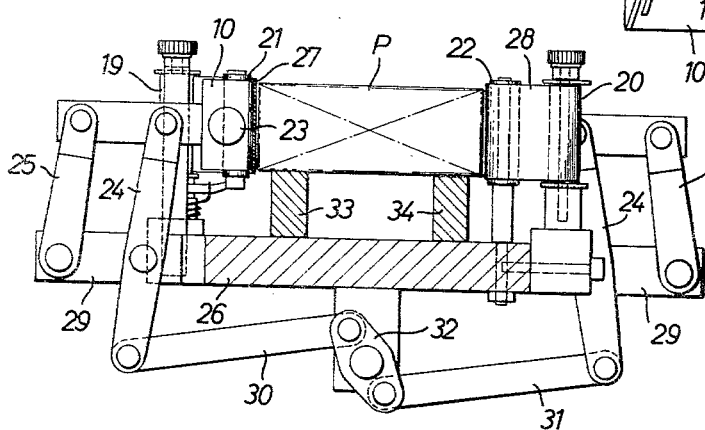

United States Patent Office 3,196,068
Patented July 20, 1965

3,196,068
APPARATUS FOR WELDING THERMOPLASTIC SHEET MATERIAL
Eduard Josef Schoder, Stuttgart-Bad Cannstatt, and Norbert Buchner, Hegnach, Waiblingen, Wurttemberg, Germany, assignors to Fa. Fr. Hesser Maschinenfabrik-Aktiengesellschaft, Stuttgart-Bad Cannstatt, Germany
Filed July 26, 1962, Ser. No. 212,547
Claims priority, application Germany, Aug. 31, 1961, H 43,538
4 Claims. (Cl. 156—537)

This invention relates to apparatus for welding thermoplastic sheets, for example of polythene, polypropylene and the like, by means of welding jaws, welding dies and the like.

The procedure of welding thermoplastic sheets under the action of pressure and heat, using for this purpose welding dies or jaws, is well known. In order to obtain a sound and firm connection of the sheets over the complete welding seam, the welding tools have hitherto been provided with relatively broad welding surfaces. In the case of homogeneous, that is to say unsupported, thermoplastic sheets, weld seams produced in the conventional way frequently exhibit rifts which impair, on the one hand, the appearance of the seam and, on the other hand, and this is more important, the sealing qualities of the seam. These shortcomings are particularly important in packaging cases, with the result that in many instances the use of homogeneous sheets, although economically most desirable, is excluded.

Underlying this invention is the problem of circumventing these drawbacks of the usual apparatus for welding thermoplastic sheets. This problem is met by the fact that, in this invention, the surface or surfaces of the tool or tools (which may not in every case be heated) through which pressure is applied to the work at the intended weld seam is or are of linear form. By linear is meant of a width not exceeding 2 mm.

Tests have shown the surprising result that the very fact of reducing the pressure area produces good welds, and that even homogeneous sheets can be heat sealed thereby without any significant difficulty.

Weld seams made by welding tools of the form referred to above have a clean and uniform appearance, and this may well be due to the fact that during the action of the heat on the sheets, particularly homogeneous sheets, the stresses which are "frozen" into the latter in manufacture are incapable of accumulating to a sufficient size in the comparatively narrow heating zones to produce a break in the seam when the latter is in fused condition.

A further advantage of the apparatus according to the invention lies in the fact that the amount of heat which is transmitted, per seam length, to the sheets, is smaller so that even the part of the heat which dissipates into the adjoining zones, when the seam cools, is so small that even here the "frozen-in" stresses can have little or no effect. This is in contrast to broader weld seams in which the zones of the sheets bounding the seams have become undulated and buckled.

Examples of apparatus according to the invention are illustrated in the accompanying drawings, and will be described in more detail below. In these drawings:

FIGURE 1 is a side view of apparatus in accordance with one embodiment of the invention for welding the mouths of bags.

FIGURE 2 is a section on the line II—II of FIGURE 1.

FIGURE 3 illustrates a second embodiment of apparatus for welding the mouths of bags.

FIGURE 4 is a plan view of a modified form of apparatus according to this invention, for welding the end folds of wrappers.

FIGURE 5 is a cross section on the line V—V of FIGURE 4.

FIGURE 6 is a front view of a detail of the apparatus seen in FIGURES 4 and 5, and FIGURE 7 is a perspective illustration of part of a package showing the final end folds.

The embodiments illustrated in FIGURES 1 to 3 are both intended for welding the upper filling openings of bags B of a synthetic thermoplastic material.

In both cases the apparatus includes arms 1, 2 which are mounted about a common pivot and thereby adapted to move scissors-wise, and these arms carry welding jaws 3, 4 (FIGURE 1) and 3', 4' (FIGURE 3). In the embodiment illustrated in FIGURES 1 and 2 the jaw 3 is unheated and forms a counter pressure jaw; has a comparatively wide application surface, whilst the heated and actual welding jaw 4 has a narrow, and practically knife edge, welding surface 5 which has a width of 2 mm. at the most. In contrast, in the embodiment of FIGURE 3, both jaws 3', 4' are heated and so form welding jaws, and they each have narrow welding surfaces 5', 5", which confront one another and are in register. An electrical heating element 6 is built into each of the welding jaws 4, 3' and 4' for the purpose of developing the requisite welding heat, and these elements are arranged to heat the welding jaws to a continuous predetermined working temperature.

During the welding operation, the opposed parts of the bag mouth are pressed together between the jaws 3, 4 and 3', 4', and to prevent parts of the bag material, when in fused condition, from adhering to the jaws, strips 7, 8 of isolating material are inserted between the material of the bag mouth and these jaws. These strips consist of an adhesion-resistant material such, for example, as tetrafluoroethylene, silicon glass silk, and the like. When welding takes place, heat penetrates, during the application of the welding jaws against the strips 7, 8, through the latter against the compressed bag mouth and this is only fused in the zone of the heated strip corresponding to the welding surfaces 5, 5', 5", and is welded along these areas.

After the jaws 3, 4 and 3', 4' are retracted, the strips 7, 8 continue to hold the mouth of the bag together until the weld seam is consolidated by cooling. For this purpose the strips 7, 8 may either be arranged closely side by side on fixed supports 9 (FIGURES 1 and 2), or they may be secured to pivotable supports 9' (FIGURE 3). In the latter case the supports 9' are advantageously operated by the arms 1, 2 through a lost-motion coupling. As seen in FIGURE 3, compression springs 35 may be provided between the arms 1, 2 and the supports 9', so as to tend to push these supports away from the arms. The supports 9' have, however, pins 36 which are trapped in slots in bars 37 fastened to the arms 1, 2 so that, when the welding jaws 3', 4' are moved towards one another the strips 7, 8 are pushed in front of them and are the first to contact the sides of the bag mouth. Contrariwise, after welding, when the arms 1, 2 move apart, the jaws 3', 4' will part from the mouth of the bag before the strips 7, 8. By this means the strips 7, 8, when the welding jaws 3', 4' are retracted, become spaced from the latter so as to allow cooling, their capacity for heat absorption being very small in relation to their superficial area. This also entails the result that during the next working stroke the bag which is then to be closed is not immediately brought into contact with warm surfaces.

The free arrangement of the strips 7, 8 has as a further object the shielding of the bag from heat radiating from the hot welding jaws 4, 3', 4'. This prevents the incidence of radiant heat from the jaws on the zones of the bag B adjoining the weld seam and, in consequence, ensures that stresses frozen into these zones will not be released and so possibly cause an undulation of the material of the bag.

The arrangement of a strip 7 in front of the unheated jaw 3 is intentional, because the latter is also heated up somewhat by heat transfer during the operation, and this particular strip 7 therefore helps to forestall any resulting damage.

The arms 1 and 2 and the welding jaws 3, 4 are moved, in the embodiment illustrated in FIGURES 1 and 2, by means of a double cam 95 which is mounted for rotation between the arms 1 and 2, these arms being biased towards one another by tension springs 96. Coupled to the cam 95 is a lever 97 which is operable to open and close the welding jaws 3, 4.

The arrangement illustrated in FIGURES 4 to 6 is used for welding the cross or tip folds at the ends of a wrapper of a package P. For this purpose two opposed welding dies 10, 11 are provided, these being heated by electrical heating elements 23, and being moved periodically against the package P, which is introduced between them on rails 33, 34. The welding dies 10, 11 have profiled or shaped welding surfaces corresponding to the form of the cross folds to be made. In the case illustrated this is a double-dovetail shape (see FIGURE 6). Here the welding surfaces are split up into a plurality of spaced and very narrow ribs 13, 14, 15 so that the folds of the wrapper are welded in a number of parallel thin lines 16, 17, 18.

In order to obtain a sound weld in depth even where there are contrasting numbers of layers of sheet material to be welded together, the welding ribs 13, 14, 15 are made broader at the parts where a plurality of layers have to be welded together, as for example in the lateral marginal zones of the folds, than for example where there are only two layers of sheet material (as will be observed from FIGURES 6 and 7). As a result, a heat amount corresponding to the number of material layers is transmitted to the appropriate welding points.

In order to prevent sticking of the sheets to the welding dies, in this embodiment adhesion-resistant or non-adherent strips 27, 28 are again arranged in front of the welding dies 10, 11. This not only prevents the adherence between the sheets of packaging material and the dies 10, 11, but again also screens the sheets from radiant heat. In addition, in the present instance the strips 27, 28 have the further function of safeguarding the previously-folded flaps at the ends of the package against premature unfolding. The strips 27, 28 in fact here constitute a resilient guideway for the packages P. They are wound on reels 19, 20 so that when wear occurs, for example at some part of a strip, this can be unwound further from the supply reel 19 and wound up on the reel 20 by an appropriate amount. Each of the strips 27, 28 is, in this example, guided around rollers 21, 22 one of which is pivotally mounted and spring biased.

Each of the welding dies 10, 11 is carried by a pair of parallel levers 24, 25, pivotally connected to it, and these in turn are pivotally mounted on an arm 29 secured to a common frame 26. The levers 24 are extended beyond their pivots on arm 29 and at the extended part are articulated, respectively through links 30, 31, to a common double crank 32. As will therefore be observed, the welding dies 10, 11 are reciprocated to and from the work by the parallelogram linkages 24, 25 in response to simple rocking of the crank 32.

It has previously been indicated that the particular arrangement of the strips 7, 8 in front of the welding tools secures the advantages set out above not only in the case of homogeneous sheets, but can also be used with advantage with other types of sheet. Amongst the latter may be mentioned the heat sealable cashiered or laminated heat sealable sheets and papers.

We claim:

1. Apparatus for welding thermoplastic sheet material comprising a frame member adapted to receive a package having thermoplastic sheet material to be welded, welding tool means pivotally mounted on said frame member, means for moving said tool means relative to the package, heating means for said tool means, linear surface means on said tool means adapted to apply welding pressure to the thermoplastic sheet material for sealing the same, a shielding strip of adhesive resistant material disposed between said linear surface means and the thermoplastic sheet material, a supply reel mounted on said frame member for storing a supply of said shielding strip, a take up reel mounted on said frame member for receiving used portions of said shielding strip, adjusting means for moving the shielding strip from said supply reel to said take up reel, and rollers receiving said shielding strip to define a guideway between said reels.

2. The combination as recited in claim 1 wherein said linear surface means comprises a plurality of spaced rib members, each of said rib members having wide and narrow portions whereby various layers of the thermoplastic sheet material receive a corresponding amount of heat.

3. The combination as recited in claim 2 wherein said welding tool means comprises a pair of oppositely disposed welding tools.

4. The combination as recited in claim 3 wherein said means for moving said welding tool means comprises a pivoted lever for each of said welding tools, an articulated link for each pivoted lever connected at an end thereof, and a double crank lever pivoted to said frame member and to adjacent ends of each articulate link whereby movement of said double crank lever effects reciprocation of said welding tools.

References Cited by the Examiner
UNITED STATES PATENTS

| | | | |
|---|---|---|---|
| 2,390,550 | 12/45 | Moore | 156—583 |
| 2,424,558 | 7/47 | Delano | 156—582 |
| 2,535,171 | 12/50 | Sundstrom | 156—583 |
| 2,638,964 | 5/53 | Andina | 156—580 |
| 3,063,890 | 11/62 | Saumsiegle | 156—583 |

EARL M. BERGERT, *Primary Examiner.*